(12) United States Patent
Oishi et al.

(10) Patent No.: US 10,689,005 B2
(45) Date of Patent: Jun. 23, 2020

(54) TRAVELING ASSIST DEVICE

(71) Applicant: DENSO CORPORATION, Kariya, Aichi-pref. (JP)

(72) Inventors: Masayoshi Oishi, Kariya (JP); Koji Fujiki, Kariya (JP); Hiroaki Niino, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 95 days.

(21) Appl. No.: 16/084,779

(22) PCT Filed: Mar. 16, 2017

(86) PCT No.: PCT/JP2017/010692
§ 371 (c)(1),
(2) Date: Sep. 13, 2018

(87) PCT Pub. No.: WO2017/159792
PCT Pub. Date: Sep. 21, 2017

(65) Prior Publication Data
US 2019/0077411 A1   Mar. 14, 2019

(30) Foreign Application Priority Data

Mar. 17, 2016 (JP) ................................ 2016-053919

(51) Int. Cl.
*G06F 7/00* (2006.01)
*G06F 19/00* (2018.01)
(Continued)

(52) U.S. Cl.
CPC ............. *B60W 50/029* (2013.01); *B60T 7/12* (2013.01); *B60W 30/10* (2013.01);
(Continued)

(58) Field of Classification Search
CPC .... B60W 50/029; B60W 30/10; B60W 50/02; B60W 30/18163; B60W 50/0205; B60W 50/10; B60W 50/12; B60W 2050/0215; B60W 2050/0292; B60W 30/12; B60W 30/14; B60T 7/12; B62D 6/00;
(Continued)

(56) References Cited

U.S. PATENT DOCUMENTS

| | | | |
|---|---|---|---|
| 6,232,910 B1 * | 5/2001 | Bell ........................ | G01S 13/18 342/70 |
| 6,400,308 B1 * | 6/2002 | Bell ........................ | G01S 13/18 342/71 |

(Continued)

FOREIGN PATENT DOCUMENTS

| | | |
|---|---|---|
| JP | 2008-094111 A | 4/2008 |
| JP | 2009-274594 A | 11/2009 |
| WO | 2016/021303 A1 | 2/2016 |

*Primary Examiner* — Khoi H Tran
*Assistant Examiner* — Jorge O Peche
(74) *Attorney, Agent, or Firm* — Maschoff Brennan

(57) ABSTRACT

A traveling assist device includes a recognition unit, a traveling control unit, a sensor determination unit, and a control decision unit. The sensor determination unit determines whether surrounding detection sensors are normal or not. The control decision unit decides whether the traveling control unit controls a lane change based on the result of determination by the sensor determination unit.

5 Claims, 3 Drawing Sheets

(51) Int. Cl.

| | |
|---|---|
| *G07C 5/00* | (2006.01) |
| *B60W 50/029* | (2012.01) |
| *B60T 7/12* | (2006.01) |
| *B62D 6/00* | (2006.01) |
| *G08G 1/16* | (2006.01) |
| *B60W 30/10* | (2006.01) |
| *B60W 50/02* | (2012.01) |
| *B60W 30/18* | (2012.01) |
| *B60W 50/10* | (2012.01) |
| *B60W 50/12* | (2012.01) |
| *G06K 9/00* | (2006.01) |
| *B60L 3/00* | (2019.01) |
| *B60L 15/20* | (2006.01) |

(52) U.S. Cl.
CPC ...... *B60W 30/18163* (2013.01); *B60W 50/02* (2013.01); *B60W 50/0205* (2013.01); *B60W 50/10* (2013.01); *B60W 50/12* (2013.01); *B62D 6/00* (2013.01); *G06K 9/00798* (2013.01); *G06K 9/00805* (2013.01); *G08G 1/16* (2013.01); *G08G 1/166* (2013.01); *G08G 1/167* (2013.01); *B60L 3/00* (2013.01); *B60L 15/20* (2013.01); *B60W 2050/0215* (2013.01); *B60W 2050/0292* (2013.01); *Y02T 10/7275* (2013.01)

(58) Field of Classification Search
CPC .......... G08G 1/16; G08G 1/166; G08G 1/167; G06K 9/00798; G06K 9/00805; B60L 3/00; B60L 15/20; Y02T 10/7275
See application file for complete search history.

(56) References Cited

U.S. PATENT DOCUMENTS

| | | | | |
|---|---|---|---|---|
| 9,014,919 | B2* | 4/2015 | Kim | B62D 15/0255 |
| | | | | 701/42 |
| 2008/0183342 | A1* | 7/2008 | Kaufmann | B60K 28/066 |
| | | | | 701/1 |
| 2011/0181728 | A1* | 7/2011 | Tieman | B60R 1/00 |
| | | | | 348/148 |
| 2011/0190972 | A1* | 8/2011 | Timmons | G01C 21/34 |
| | | | | 701/31.4 |
| 2012/0221168 | A1* | 8/2012 | Zeng | G08G 1/09626 |
| | | | | 701/1 |
| 2013/0027511 | A1* | 1/2013 | Takemura | G06K 9/00798 |
| | | | | 348/42 |
| 2015/0110350 | A1* | 4/2015 | Mian | G08G 1/162 |
| | | | | 382/103 |
| 2015/0141043 | A1* | 5/2015 | Abramson | G01C 21/34 |
| | | | | 455/456.1 |
| 2015/0231977 | A1* | 8/2015 | Morita | B60L 50/62 |
| | | | | 320/109 |
| 2016/0091896 | A1* | 3/2016 | Maruyama | B60W 10/04 |
| | | | | 701/23 |
| 2016/0114811 | A1* | 4/2016 | Matsuno | B60W 50/0225 |
| | | | | 701/23 |
| 2016/0321923 | A1* | 11/2016 | Seo | G08G 1/096775 |
| 2017/0320500 | A1* | 11/2017 | Yoo | B60W 30/0956 |
| 2017/0320521 | A1* | 11/2017 | Fujita | B62D 6/00 |
| 2018/0023951 | A1* | 1/2018 | Seo | G01B 11/275 |
| | | | | 356/138 |
| 2018/0067496 | A1* | 3/2018 | Prasad | G01S 15/86 |
| 2018/0154937 | A1* | 6/2018 | Tatsukawa | G06K 9/00798 |
| 2018/0194364 | A1* | 7/2018 | Asakura | B60W 30/18163 |
| 2018/0345959 | A1* | 12/2018 | Fujii | B60W 30/0956 |
| 2018/0345960 | A1* | 12/2018 | Fujii | B62D 15/0255 |
| 2018/0345978 | A1* | 12/2018 | Fujii | B62D 15/0265 |
| 2018/0346019 | A1* | 12/2018 | Fujii | B62D 6/003 |
| 2018/0346026 | A1* | 12/2018 | Fujii | B62D 15/0255 |
| 2018/0346027 | A1* | 12/2018 | Fujii | B60Q 9/00 |
| 2018/0350242 | A1* | 12/2018 | Fujii | B60W 30/18163 |
| 2018/0370423 | A1* | 12/2018 | Marx | B60Q 1/40 |
| 2019/0051188 | A1* | 2/2019 | Moustafa | G05D 1/0293 |
| 2019/0137305 | A1* | 5/2019 | Karabacak | G08G 1/02 |
| 2019/0164429 | A1* | 5/2019 | Chiba | G01S 7/414 |
| 2019/0258251 | A1* | 8/2019 | Ditty | G05D 1/0088 |
| 2019/0291726 | A1* | 9/2019 | Shalev-Shwartz | |
| | | | | B60W 30/0953 |
| 2019/0291727 | A1* | 9/2019 | Shalev-Shwartz | |
| | | | | B60W 30/0956 |
| 2019/0291728 | A1* | 9/2019 | Shalev-Shwartz | |
| | | | | B60W 30/0953 |

* cited by examiner

TRAVELING ASSIST DEVICE

CROSS-REFERENCE TO RELATED APPLICATION

This application is the U.S. national phase of International Application No. PCT/JP2017/010692 filed Mar. 16, 2017 which designated the U.S. and claims priority to Japanese Patent Application No. 2016-53919 filed Mar. 17, 2016, the contents of which are incorporated herein by reference.

TECHNICAL FIELD

The present disclosure relates to a technique for controlling lane change of a vehicle.

BACKGROUND ART

Known techniques for lane recognition include detecting lanes of the road on which a vehicle is traveling with surrounding detection sensors such as a camera and recognizing the lanes of the road based on detection information acquired from the surrounding detection sensors. A traveling assist device described in PTL 1 below recognizes the present lane in which the vehicle is traveling and an adjacent lane as the destination of a lane change of the vehicle from the present lane, and controls the lane change of the vehicle.

CITATION LIST

Patent Literature

[PTL 1] JP 2008-094111 A

SUMMARY OF THE INVENTION

When the traveling assist device controls the lane change of the vehicle, the traveling assist device needs to detect objects around the vehicle as well as road lanes. The inventors have found the following problem through their detailed study: an abnormality in at least one of surrounding detection sensors that detect objects around the vehicle and the lanes can make it impossible to appropriately control the lane change of the vehicle.

The technique described in PTL 1 does not consider whether surrounding detection sensors that detect objects around the vehicle and road lanes are normal or not.

It is desirable that an aspect of the present disclosure can provide a technique for appropriately controlling a lane change of a vehicle in consideration of whether surrounding detection sensors that detect objects around the vehicle and road lanes are normal or not.

A traveling assist device according to an aspect of the present disclosure includes a recognition unit, a traveling control unit, a sensor determination unit, and a control decision unit.

The recognition unit recognizes objects around a vehicle and lanes of the road in which the vehicle is traveling based on detection information acquired from one or more surrounding detection sensors that detect the objects around the vehicle and the lanes of the road in which the vehicle is traveling. The traveling control unit controls the lane change of the vehicle based on at least the result of recognition by the recognition unit.

The sensor determination unit determines whether the surrounding detection sensors are normal or not. The control decision unit decides whether the traveling control unit controls the lane change based on the result of determination by the sensor determination unit.

The control decision unit decides that the traveling control unit controls the lane change in response to the sensor determination unit determining that all the surrounding detection sensors are normal.

The control decision unit causes the traveling control unit to terminate controlling the lane change if the vehicle traveling in a present lane has not entered an adjacent lane as a lane change destination, and causes the traveling control unit to continue controlling the lane change by at least one of making a velocity of the vehicle greater than before occurrence of the abnormality in the surrounding detection sensors and increasing a steering angle if at least part of the vehicle has entered the adjacent lane in response to the sensor determination unit determining that at least one of the surrounding detection sensors is abnormal.

According to this configuration, a lane change of a vehicle can be appropriately controlled in consideration of whether surrounding detection sensors that detect objects around the vehicle and road lanes are normal or not.

DESCRIPTION OF EMBODIMENTS

Hereinafter, embodiments of the present disclosure will be described with reference to the drawings.

1. CONFIGURATION

Figure 1:
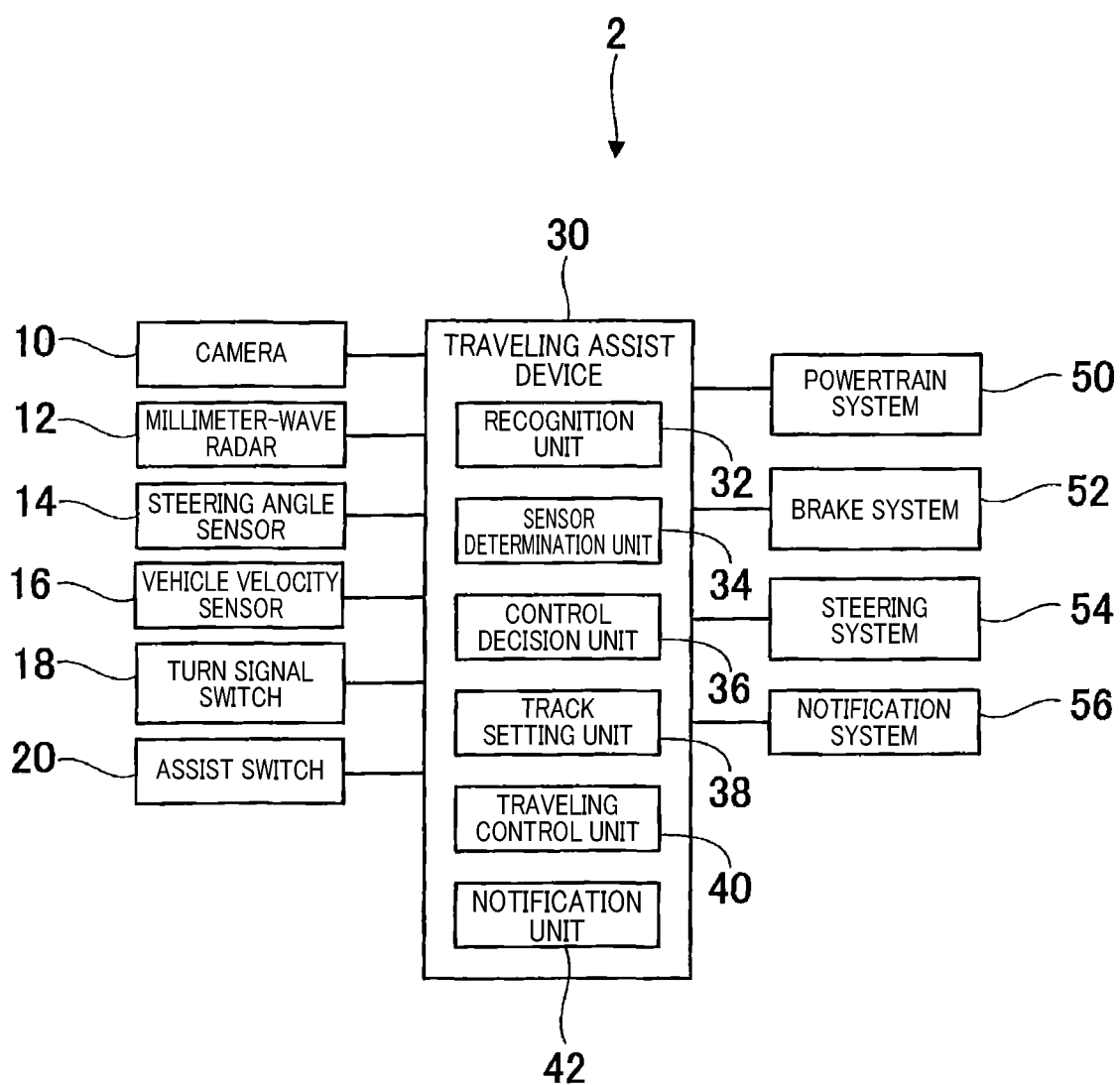
FIG. 1 is a block diagram illustrating a traveling assist device according to the present embodiment.

An in-vehicle traveling assist system 2 illustrated in FIG. 1 includes a camera 10, a millimeter-wave radar 12, a steering angle sensor 14, a vehicle velocity sensor 16, a turn signal switch 18, an assist switch 20, a traveling assist device 30, a powertrain system 50, a brake system 52, a steering system 54, and a notification system 56. The traveling assist system 2 is mounted in a vehicle 100 illustrated in FIG. 2.

The camera 10 is attached, for example, to each of the front and rear sides of the vehicle 100. The camera 10 captures the area surrounding the vehicle 100 to obtain image data, and outputs the image data as detection information to the traveling assist device 30.

The millimeter-wave radar 12 is attached, for example, to each of the front and rear sides of the vehicle 100. The millimeter-wave radar 12 calculates the distance to an object such as another vehicle 110 or a pedestrian around the vehicle 100 based on the time from transmission of millimeter waves to reception of reflected waves, i.e., millimeter waves reflected by the object. Furthermore, the bearing, or the angle, from the vehicle 100 to the object is determined from the direction of receiving reflected waves. The millimeter-wave radar 12 outputs the calculated distance and angle as detection information to the traveling assist device 30.

Note that instead of the radar that emits radio waves such as the millimeter-wave radar 12, LIDAR that emits laser light may be used.

The steering angle sensor 14 detects the steering angle of the vehicle 100. The vehicle velocity sensor 16 detects the velocity of the vehicle 100. The turn signal switch 18 is a switch that is operated by the driver, an occupant of the vehicle 100, to flash the turn signals on the traveling direction side when the vehicle 100 turns right or left or when the vehicle 100 changes lanes.

The turn signal switch 18 may be a lever switch such as a turn signal lever, or may be a push-button switch. The turn signal switch 18 may be a switch displayed on a display, instead of a mechanical switch. Instead of a switch, voice input of the traveling direction of the vehicle 100 may cause the turn signals on the traveling direction side to flash on and off.

The assist switch 20 allows the traveling assist device 30 to execute lane change control while it is turned on, and prohibits the traveling assist device 30 from executing lane change control while it is turned off.

The traveling assist device 30 is equipped with a microcomputer including a CPU, a RAM, a ROM, and a semiconductor memory such as a flash memory. Note that the traveling assist device 30 may be equipped with a single microcomputer, or may be equipped with a plurality of microcomputers.

The CPU executes a program stored in a non-transitory tangible recording medium such as the ROM or the flash memory, whereby each function of the traveling assist device 30 is implemented. Once the program is executed, the method corresponding to the program is executed.

The traveling assist device 30 includes, as a functional configuration that is implemented as the CPU executes the program, a recognition unit 32, a sensor determination unit 34, a control decision unit 36, a track setting unit 38, a traveling control unit 40, and a notification unit 42. The method of implementing these components constituting the traveling assist device 30 is not limited to software, and some or all of the components may be implemented using hardware including a combination of logic circuit, analog circuit and the like.

The recognition unit 32 recognizes objects around the vehicle 100 and lanes of the road in which the vehicle 100 is traveling based on detection information acquired from the camera 10 and the millimeter-wave radar 12 that detect objects around the vehicle 100 and lanes of the road in which the vehicle 100 is traveling.

Figure 2:
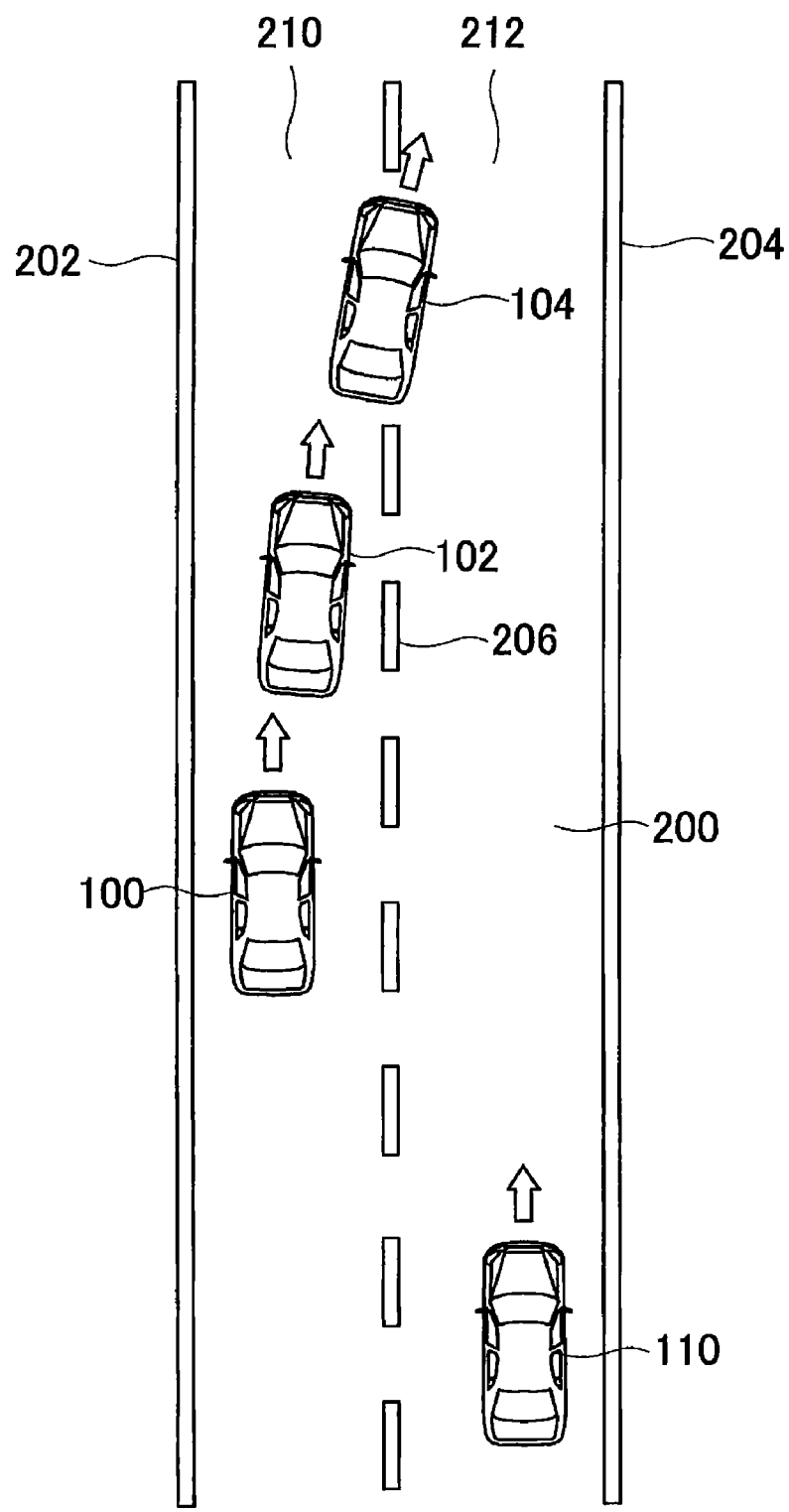
FIG. 2 is a schematic diagram for explaining a lane change of a vehicle.

For example, as illustrated in FIG. 2, the recognition unit 32 calculates positions of white lines 202, 204, and 206 of a road 200 in which the vehicle 100 is traveling, lane widths indicated by the distances between the white lines, the curvatures of the white lines, and the like based on image data of the areas in front of and behind the vehicle 100 acquired from the camera 10.

The recognition unit 32 recognizes the white lines 202, 204, and 206 to recognize lanes 210 and 212 of the road 200 in which the vehicle 100 is traveling. Note that vehicles 100, 102, and 104 in FIG. 2 represent the same vehicle that is changing lanes.

The recognition unit 32 further distinguishes between the lanes 210 and 212 based on the positions of the white lines 202, 204, and 206 and the position of the vehicle 100 to recognize the present lane 210 in which the vehicle 100 is traveling and the adjacent lane 212 adjacent to the present lane 210. The recognition unit 32 acquires the position of the vehicle 100, for example, from a GPS device (not illustrated).

The recognition unit 32 recognizes another vehicle 110 traveling in the adjacent lane 212 adjacent to the present lane 210 based on detection information of the areas in front of and behind the vehicle 100 acquired from the camera 10 and the millimeter-wave radar 12. In FIG. 2, another vehicle 110 is traveling behind the vehicle 100.

The recognition unit 32 calculates a position of the other vehicle 110 based on image data of the areas in front of and behind the vehicle 100 acquired from the camera 10, and also calculates the velocity of another vehicle 110 using how much the position of another vehicle 110 has changed. The recognition unit 32 also calculates, for example, the position of the other vehicle 110 and the velocity of the other vehicle 110 relative to the vehicle 100 based on detection information of the areas in front of and behind the vehicle 100 acquired from the millimeter-wave radar 12.

The sensor determination unit 34 determines whether the camera 10 and the millimeter-wave radar 12 are abnormal as surrounding detection sensors that acquire information for use by the traveling assist device 30 in controlling a lane change by the vehicle 100.

The sensor determination unit 34 determines that the camera 10 is abnormal if image data acquired from the camera 10 do not change frame by frame. The sensor determination unit 34 also determines that the camera 10 or the millimeter-wave radar 12 is abnormal if the level of a signal input from the camera 10 or the millimeter-wave radar 12 is constant and does not change, or if the level of a signal exceeds the normal range, for example.

The control decision unit 36 decides whether the traveling assist device 30 controls the lane change of the vehicle based on whether the camera 10 and the millimeter-wave radar 12 are normal or not.

The track setting unit 38 sets a traveling track such that the vehicle 100 avoids a collision with another vehicle 110 when changing lanes based on the result of recognition by the recognition unit 32 and the output from the vehicle velocity sensor 16. The track setting unit 38 may set a new traveling track in response to a change in the velocity of another vehicle 110 traveling in the adjacent lane during the lane change of the vehicle. A traveling track for changing lanes is set such that the lateral acceleration applied to the vehicle 100 during its lane change is equal to or less than a value that does not give a sense of discomfort to occupants of the vehicle 100.

The traveling control unit 40 controls the powertrain system 50, the brake system 52, and the steering system 54 such that the vehicle 100 travels along the traveling track set by the track setting unit 38 while changing the lane. Specifically, the traveling control unit 40 controls the velocity and steering angle of the vehicle 100 during the lane change of the vehicle.

If at least one of the camera 10 and the millimeter-wave radar 12, which are surrounding detection sensors, is abnormal, the notification unit 42 instructs the notification system 56 to notify occupants of the vehicle 100 of the abnormality in the surrounding detection sensors.

In a case where an internal combustion engine is mounted as a drive source, the powertrain system 50 controls a position of a throttle device and an amount of fuel injection in accordance with the drive output indicated by the traveling control unit 40. In a case where a motor is mounted as a drive source, the powertrain system 50 controls power supply to the motor in accordance with the drive output indicated by the traveling control unit 40.

The brake system 52 controls an actuator provided on a hydraulic circuit of a hydraulic brake in accordance with the braking force indicated by the traveling control unit 40. In a case where a motor is mounted as the drive source of the vehicle 100, the brake system 52 may control the power supply to the motor to generate regenerative braking force in accordance with the braking force indicated by the traveling control unit 40.

The steering system 54 drives a steering wheel in accordance with the torque indicated by the traveling control unit 40 to steer the vehicle 100.

The notification system 56 actuates speakers, displays, lamps, vibrators, and the like in response to an instruction from the notification unit 42.

2. PROCESS

Figure 3:
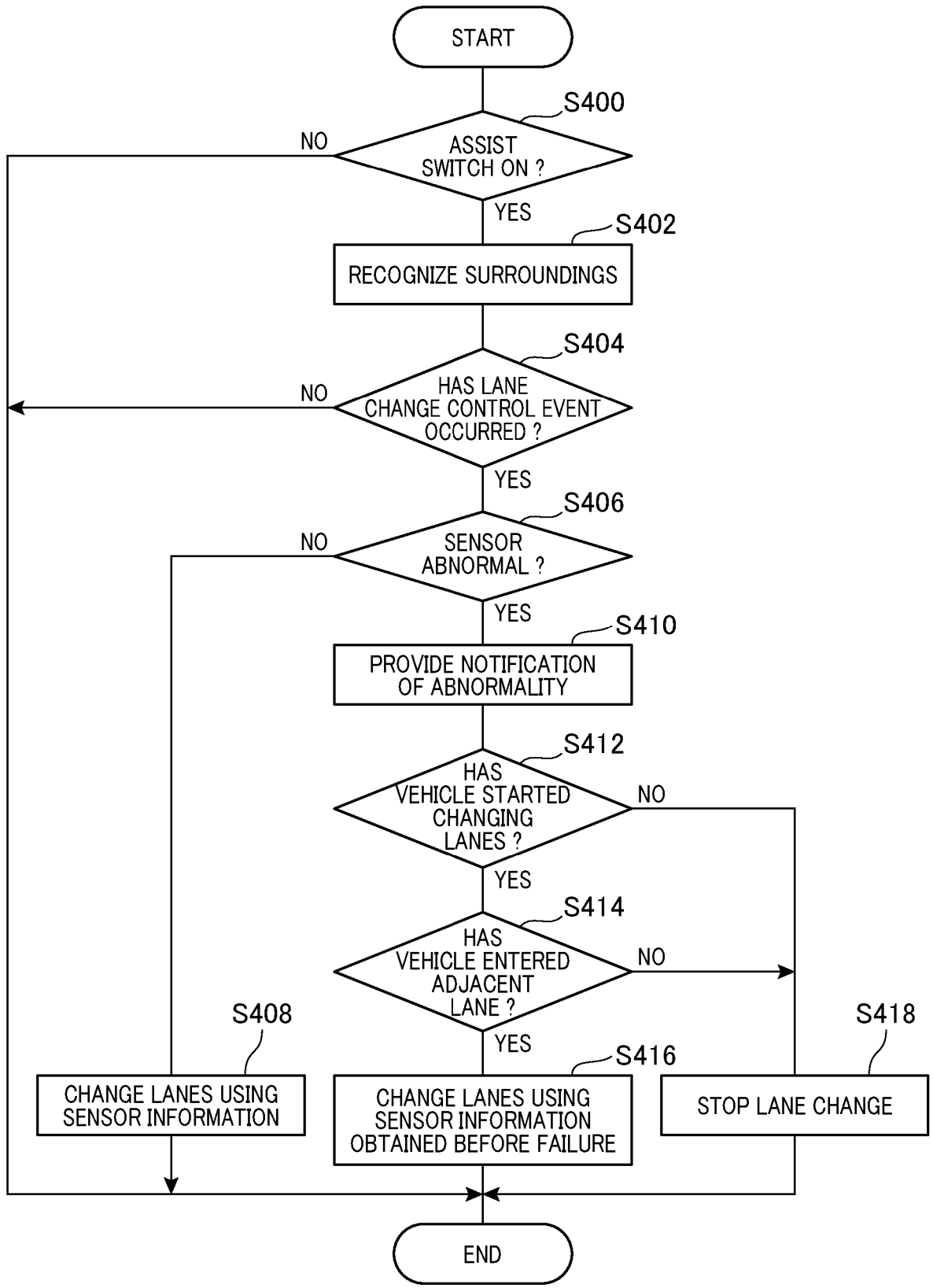
FIG. 3 is a flowchart illustrating a traveling assist process.

Hereinafter, a traveling assist process that is executed by the traveling assist device 30 will be described based on the flowchart of FIG. 3. The process corresponding to the flowchart of FIG. 3 is constantly executed at certain time intervals.

In S400, the control decision unit 36 determines whether the output of the assist switch 20 is on. If the determination in S400) is No, that is, if the assist switch 20 is off, the lane change control is prohibited. Thus, this process is finished.

If the determination in S400 is Yes, that is, if the assist switch 20 is on, the lane change control is allowed. Thus, in S402, the recognition unit 32 recognizes objects around the vehicle 100 and lanes of the road in which the vehicle 100 is traveling based on detection information acquired from the camera 10 and the millimeter-wave radar 12.

In S404, the control decision unit 36 determines whether an event that causes the traveling control unit 40 to control a lane change has occurred. Examples of events that cause the traveling control unit 40 to control the lane change include (1) to (3) below. In a case of causing the traveling control unit 40 to control the lane change in response to the occurrence of event (2) or (3), the control decision unit 36 causes the traveling control unit 40 to flash the turn signals on the destination lane side.

(1) A lane change instruction is given by an occupant of the vehicle 100. The occupant of the vehicle 100 gives a lane change instruction for the vehicle 100, for example, by operating a switch such as the turn signal switch 18 or through voice input.

(2) During cruise control for driving the vehicle 100 at a set velocity, another vehicle is traveling ahead of the vehicle 100 in the present lane at a velocity lower than the set velocity by a certain velocity or more.

(3) An obstacle is present ahead of the vehicle 100.

If the determination in S404 is No, that is, if an event that causes the traveling control unit 40 to control the lane change has not occurred, this process is finished.

If the determination in S404 is Yes, that is, if an event that causes the traveling control unit 40 to control the lane change has occurred, as mentioned above, the sensor determination unit 34 determines in S406 whether at least one of the camera 10 and the millimeter-wave radar 12 is abnormal based on the contents of detection information acquired from the camera 10 and the millimeter-wave radar 12 and the signal level of detection information.

If the determination in S406 is No, that is, if both the camera 10 and the millimeter-wave radar 12, which are surrounding detection sensors, are normal, the control decision unit 36 decides to cause the traveling control unit 40 to control the lane change based on information acquired from various sensors including the surrounding detection sensors. Accordingly, the process proceeds to S408.

In S408, the track setting unit 38 sets a traveling track for the lane change by the vehicle 100 based on the result of recognition by the recognition unit 32 and the velocity of the vehicle 100 acquired from the vehicle velocity sensor 16.

Then, in S408, the traveling control unit 40 controls the powertrain system 50, the brake system 52, and the steering system 54 such that the vehicle 102, 104 changes lanes without leaving the traveling track set by the track setting unit 38.

If the determination in S406 is Yes, that is, if at least one of the camera 10 and the millimeter-wave radar 12 is abnormal, the notification unit 42 instructs the notification system 56 to provide notification of the abnormality in the surrounding detection sensors using sound, images, light, vibration, and the like in S410.

In S412, the control decision unit 36 determines whether the vehicle has started changing lanes as the vehicle 102, 104 illustrated in FIG. 2. If the determination in S412 is No, that is, if the vehicle has not started changing lanes as the vehicle 100, the control decision unit 36 determines that appropriate detection information for use by the traveling control unit 40 in controlling the lane change cannot be acquired due to the abnormality in at least one of the camera 10 and the millimeter-wave radar 12. In this case, the process proceeds to S418.

If the determination in S412 is Yes, that is, if the vehicle has started changing lanes as the vehicle 102, 104 and the vehicle 102, 104 has been traveling in a direction toward the adjacent lane 212, the control decision unit 36 determines in S414 whether at least a part of the vehicle 102, 104 has entered the adjacent lane 212.

If the determination in S414 is No, that is, if the vehicle 102 has not entered the adjacent lane 212, the control decision unit 36 determines that detection information for use by the traveling control unit 40 in continuing controlling the lane change cannot be acquired due to the abnormality in the surrounding detection sensors, and the process proceeds to S418.

If the determination in S414 is Yes, that is, if at least a part of the vehicle 104 has entered the adjacent lane 212, the control decision unit 36 decides to cause the traveling control unit 40 to control the lane change based on detection information acquired before the occurrence of the abnormality in the surrounding detection sensors. Consequently, in S416, the traveling control unit 40 controls the lane change along the traveling track set by the track setting unit 38 based on detection information acquired before the occurrence of the abnormality in the surrounding detection sensors.

Note that detection information acquired before the occurrence of the abnormality in the surrounding detection sensors includes the distance and relative velocity between the vehicle 104 and another vehicle 110 traveling behind the vehicle 104 in the adjacent lane 212, the positions of the white lines 202, 204, and 206, and the like.

In the event that at least either one of the camera 10 and the millimeter-wave radar 12 becomes abnormal while at least a part of the vehicle 104 is in the adjacent lane 212, it is desirable that the lane change be finished immediately. Therefore, the traveling control unit 40 finishes the lane change as soon as possible by making the velocity or steering angle of the vehicle 104 greater than before the occurrence of the abnormality in the surrounding detection sensors.

In S418, the control decision unit 36 causes the traveling control unit 40 to terminate the lane change control. Consequently, the traveling control unit 40 terminates the lane change control.

3. EFFECTS

According to the embodiment described above, the following effects can be obtained.

(1) The control decision unit 36 decides whether the traveling control unit 40 controls the lane change of the vehicle based on the result of determination by the sensor determination unit 34 that determines whether the surrounding detection sensors that output detection information for use by the traveling control unit 40 in controlling a lane change are functioning normaly or not. Therefore, the lane change of the vehicle can be appropriately controlled in consideration of whether the surrounding detection sensors that output detection information for use by the vehicle in changing lanes appropriately are normal or not.

(2) It can be appropriately decided whether to terminate or continue the lane change control in accordance with the timing of detecting an abnormality in at least one of the surrounding detection sensors. For example, in a case where the vehicle has not started changing lanes yet despite the initiation of the lane change control, the control decision unit 36 terminates the lane change of the vehicle in consideration of the safety of vehicle traveling if at least one of the surrounding detection sensors is abnormal.

Alternatively, in a case where the vehicle has not entered the adjacent lane yet and has still been traveling in the present lane despite the initiation of the lane change of the vehicle, the control decision unit 36 terminates the lane change of the vehicle in consideration of the safety of vehicle traveling if at least one of the surrounding detection sensors is abnormal.

In contrast, if an abnormality in at least one of the surrounding detection sensors is detected while at least a part of the vehicle is in the adjacent lane under lane change control, the control decision unit 36 causes the traveling control unit 40 to continue the controlling of the lane change based on detection information acquired from the surrounding detection sensors before the occurrence of the abnormality in the surrounding detection sensors. This is because it has already been determined that the lane change can be completed based on detection information acquired from the surrounding detection sensors before the occurrence of the abnormality in the surrounding detection sensors.

(3) In a case where the lane change control is continued while at least one of the surrounding detection sensors is abnormal, the lane change can be completed more rapidly and safely by increasing the velocity of the vehicle or increasing the steering angle toward the adjacent destination lane.

(4) If an abnormality in at least one of the surrounding detection sensors is detected after the initiation of the lane change control, notification of the abnormality in the sensors is provided using sound, images, light, vibration, and the like. Consequently, for example, in a case where the lane change of the vehicle is not executed despite the driver's lane change instruction provided through the operation for the turn signal lever, the driver can understand the reason why the lane change is not executed.

In the embodiment described above, the camera 10 and the millimeter-wave radar 12 correspond to surrounding detection sensors, another vehicle 110 corresponds to an object around the vehicle, and the turn signal switch 18 corresponds to an input device.

In the above embodiment, S400, S404, S412, S414, and S418 correspond to the process of the control decision unit 36, S402 corresponds to the process of the recognition unit 32, S406 corresponds to the process of the sensor determination unit 34, S410 corresponds to the process of the notification unit 42, and S408 and S416 correspond to the process of the traveling control unit 40.

4. OTHER EMBODIMENTS (1) In the above embodiment, in a case where at least one of the camera 10 and the millimeter-wave radar 12 as surrounding detection sensors is abnormal and the vehicle in the present lane 210 has not entered the adjacent lane 212 yet, the traveling assist device 30 terminates the lane change control.

Alternatively, in a case where at least one of the surrounding detection sensors is abnormal and the vehicle has not entered the adjacent lane 212 yet, the traveling assist device 30 may control the lane change as long as there is a normal surrounding detection sensor based on detection information acquired from the normal surrounding detection sensor.

(2) Even in a case where the vehicle has not entered the adjacent lane yet, if the velocity of the vehicle is low and less than a certain velocity, or if the relative velocity of another vehicle traveling behind the vehicle in the adjacent lane with respect to the vehicle is low and less than a certain velocity, the traveling assist device 30 may control the lane change of the vehicle as long as at least one of the surrounding detection sensors is normal.

(3) In a case where at least one of the surrounding detection sensors is abnormal but there is still a normal surrounding detection sensor, the traveling assist device 30 may control the lane change until detection information acquired from the surrounding detection sensors before the occurrence of the abnormality becomes inapplicable to the lane change control. For example, if a surrounding detection sensor originally having a detection range of 100 meters ahead of the vehicle becomes abnormal, the traveling assist device 30 may control the lane change to be completed within 100 meters ahead in the traveling direction.

Then, once the vehicle travels beyond the original detection range of the abnormal surrounding detection sensor and information acquired from that surrounding detection sensor before the occurrence of the abnormality becomes inapplicable to the lane change control, the traveling assist device 30 terminates the lane change control. In this case, it is desirable that the notification unit 42 provides notification of the termination of the lane change control.

(4) If at least one of the surrounding detection sensors becomes abnormal during the lane change control but the lane change can be completed based on detection information acquired before the occurrence of the abnormality, the traveling assist device 30 may continue the lane change regardless of the position of the vehicle 100, 102, 104 in FIG. 2. If the lane change cannot be completed safely using detection information acquired from the surrounding detection sensors before the occurrence of the abnormality, it is desirable that the traveling assist device 30 terminates the lane change.

(5) In the above embodiment, the camera 10 and the millimeter-wave radar 12 are used as surrounding detection sensors. Alternatively, for example, either one of the camera 10 and the millimeter-wave radar 12 may be used as a surrounding detection sensor. Still alternatively, other sensors may be used as surrounding detection sensors in addition to the camera 10 and the millimeter-wave radar 12, or other sensors may be used as surrounding detection sensors instead of the camera 10 and the millimeter-wave radar 12.

(6) In the above embodiment, a plurality of functions of a single component may be implemented by a plurality of components, or a single function of a single component may be implemented by a plurality of components. A plurality of functions of a plurality of components may be implemented by a single component, or a single function that is implemented by a plurality of components may be implemented by a single component. Part of the configuration of the above embodiment may be omitted. At least part of the configuration of the above embodiment may be added to or replaced by the configuration of another embodiment. Note that every aspect included in the technical idea specified only by the terms described in the claims is an embodiment of the present disclosure.

(7) In addition to the above-mentioned traveling assist device 30, the present disclosure can be implemented in various forms such as a traveling assist system 2 including the traveling assist device 30 as a component, a traveling assist program for causing a computer to function as the traveling assist device 30, a recording medium with the traveling assist program recorded therein, and a traveling assist method.

The invention claimed is:

1. A traveling assist device comprising:
    a recognition unit configured to recognize an object around a vehicle and lanes of a road in which the vehicle is traveling based on detection information acquired from one or more surrounding detection sensors that detect the object and the lanes;
    a traveling control unit configured to control a lane change of the vehicle based on at least a result of recognition by the recognition unit;
    a sensor determination unit configured to determine whether the surrounding detection sensors are normal or abnormal; and
    a control decision unit configured to decide whether the traveling control unit controls the lane change based on a result of determination by the sensor determination unit, wherein
    the control decision unit decides that the traveling control unit controls the lane change in response to the sensor determination unit determining that all the surrounding detection sensors are normal, and
    in response to the sensor determination unit determining that at least one of the surrounding detection sensors is abnormal, the control decision unit:
        causes the traveling control unit to terminate controlling the lane change if the vehicle traveling in a present lane has not entered an adjacent lane as a lane change destination; and
        causes the traveling control unit to continue controlling the lane change by at least one of making a velocity of the vehicle greater than before occurrence of the abnormality in the surrounding detection sensors and increasing a steering angle if at least part of the vehicle has entered the adjacent lane.

2. The traveling assist device according to claim 1, wherein
    the recognition unit is configured to acquire the detection information of another vehicle, which is traveling behind the vehicle in an adjacent lane adjacent to a present lane in which the vehicle is traveling, from at least one of the surrounding detection sensors.

3. The traveling assist device according to claim 1, wherein
    the control decision unit is configured to decide whether the traveling control unit controls the lane change based on the result of determination by the sensor determination unit in response to a lane change instruction being inputted through an input device by an occupant of the vehicle.

4. The traveling assist device according to claim 1, wherein
    in response to the sensor determination unit determining that at least one of the surrounding detection sensors is abnormal while the traveling control unit is controlling the lane change, the control decision unit is configured to decide whether to cause the traveling control unit to continue or terminate controlling the lane change based on the detection information acquired by the traveling control unit from the surrounding detection sensors before the determination of the abnormality in the surrounding detection sensors.

5. The traveling assist device according to claim 1, wherein
    the traveling control unit is configured to control at least a steering angle of the vehicle when controlling the lane change.

* * * * *